United States Patent [19]

Mizuno et al.

[11] Patent Number: 4,547,636
[45] Date of Patent: Oct. 15, 1985

[54] SLIDABLE CONTACT ASSEMBLY

[75] Inventors: Shigeo Mizuno; Kazuhisa Kubota; Takahumi Ichikawa, all of Aichi, Japan

[73] Assignee: Kabushiki Kaisha Tokai-Rika-Denki-Seisakusho, Aichi, Japan

[21] Appl. No.: 527,659

[22] Filed: Aug. 30, 1983

[30] Foreign Application Priority Data

Aug. 31, 1982 [JP]  Japan ............................ 57-130539[U]

[51] Int. Cl.$^4$ ............................................. H01H 9/00
[52] U.S. Cl. ................................ 200/61.54; 310/232; 339/3 S
[58] Field of Search ............. 200/61.54, 61.27, 164 R, 200/61.55, 61.56, 61.57, 61.38, 61.4, 4; 307/10 LS; 339/3 S, 3 R; 310/232, 238; 74/484

[56] References Cited

U.S. PATENT DOCUMENTS

| 1,219,247 | 3/1917 | Carmichael | 200/61.54 |
| 1,480,659 | 1/1924 | Blackburn | 339/3 S |
| 1,699,392 | 1/1929 | Fisher | 200/61.54 X |

*Primary Examiner*—G. P. Tolin
*Assistant Examiner*—Morris Ginsburg
*Attorney, Agent, or Firm*—George J. Brandt, Jr.

[57] ABSTRACT

In a slip ring suitable for appliance to a steering system of a vehicle a plurality of contacts arranged axially have spacers among them and flexible contacts are in elastic contact with the respective plurality of contacts. Accordingly, the flexible contacts are relatively rotated to the plurality of contacts at a time of the rotation of a steering wheel of the vehicle while the plurality of contacts and the flexible contacts are kept in a conductive condition therebetween, so that many switches can be mounted on the steering wheel.

6 Claims, 5 Drawing Figures

4,547,636

SLIDABLE CONTACT ASSEMBLY

BACKGROUND OF THE INVENTION

1. Field of the Invention

The present invention relates to an improvement in a slip ring used, for example, in case that signals put out from various switches mounted on a steering wheel of a vehicle are transmitted to loads of a fixed type.

2. Description of the Prior Art

In the switches mounted on the steering wheel of the vehicle the slip ring has conventionally been used for electrical connections between the various switches mounted on a switch pad of a central portion of the steering wheel and the loads. In the prior art, for example, the slip ring has a structure shown in FIGS. 1 and 2. The slip ring consists substantially of a fixed member B provided therein co-axially in its radial direction with a few fixed contacts, for example, three fixed contacts $A_1$, $A_2$ and $A_3$ of three lanes formed with an outermost lane, a middle lane, or central lane, and an innermost lane, the fixed member B being fixed to the vehicle body, and a case C fixed to the steering wheel and provided with the same number of movable contacts opposed to the fixed contacts, for example, three movable contacts $D_1$, $D_2$ and $D_3$ respectively consisting of conductive plane springs and contacts, as shown in FIGS. 1 and 2. The case C can be rotated together with the steering wheel so that the movable contacts $D_1$ to $D_3$ are slidably brought into contact with the fixed contacts $A_1$ to $A_3$, respectively and thereby the signals put out from the switches can always be transmitted to the loads. However, in case that various switches are mounted on the steering wheel besides a horn switch whereby the signals are transmitted directly to the loads, both the number of the lanes having the fixed contacts and the number of the lanes having the movable contacts must be increased respectively in accordance with an increase in the mumber cf the switches.

However, if the number of the lanes is increased, the slip ring itself must be enlarged in its radial direction, but the slip ring has been provided with only three lanes at most in the prior art because the places or spaces where a steering column, the steering wheel and the like are mounted must necessarily be of a limited size, which results in that the number of the switches to be mounted on the steering wheel can not be increased.

In addition, a PCM electrical transmission system is used for transmission of the signals put out from many switches in the prior slip ring. However, if this system is adopted, a circuit portion must also be provided in the system therefor, which causes the increase of manufacturing cost.

SUMMARY OF THE INVENTION

The present invention has been developed to obviate the above-described disadvantages of the prior art and has as its object the provision of a slip ring being of a small size and being easy to be mounted and assembled where a cover and a base are rotable relatively to one another and one of them is provided with flexible contacts arranged in an axial direction of a steering shaft, the other being provided with contacts brought into contact with the flexible contacts, whereby it is made possible to adopt many lanes and signals can be transmitted from many switches mounted on a movable member directly to loads mounted on a fixed member.

Description will hereinunder be given of an embodiment of the invention with reference to the attached drawings.

BRIEF DESCRIPTION OF THE INVENTION

DESCRIPTION OF THE PREFERRED EMBODIMENT

Figure 1:
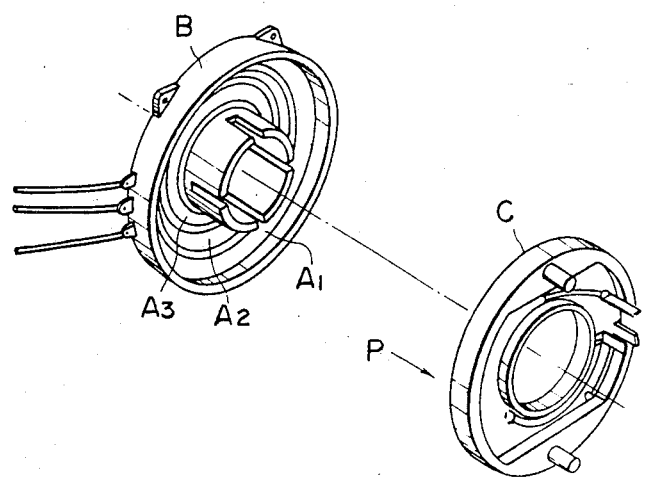
FIG. 1 is a disassembled perspective view showing one example of a prior slip ring.
Figure 2:
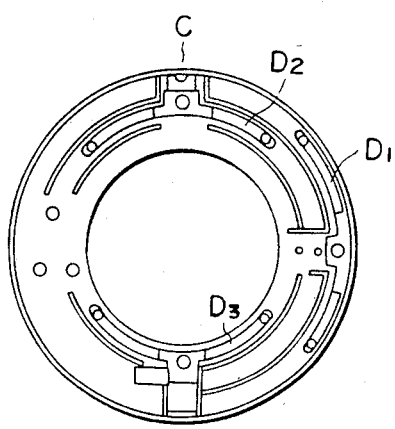
FIG. 2 is a front view of the slip ring observed from the direction of an arrow P shown in FIG. 1.
Figure 3:
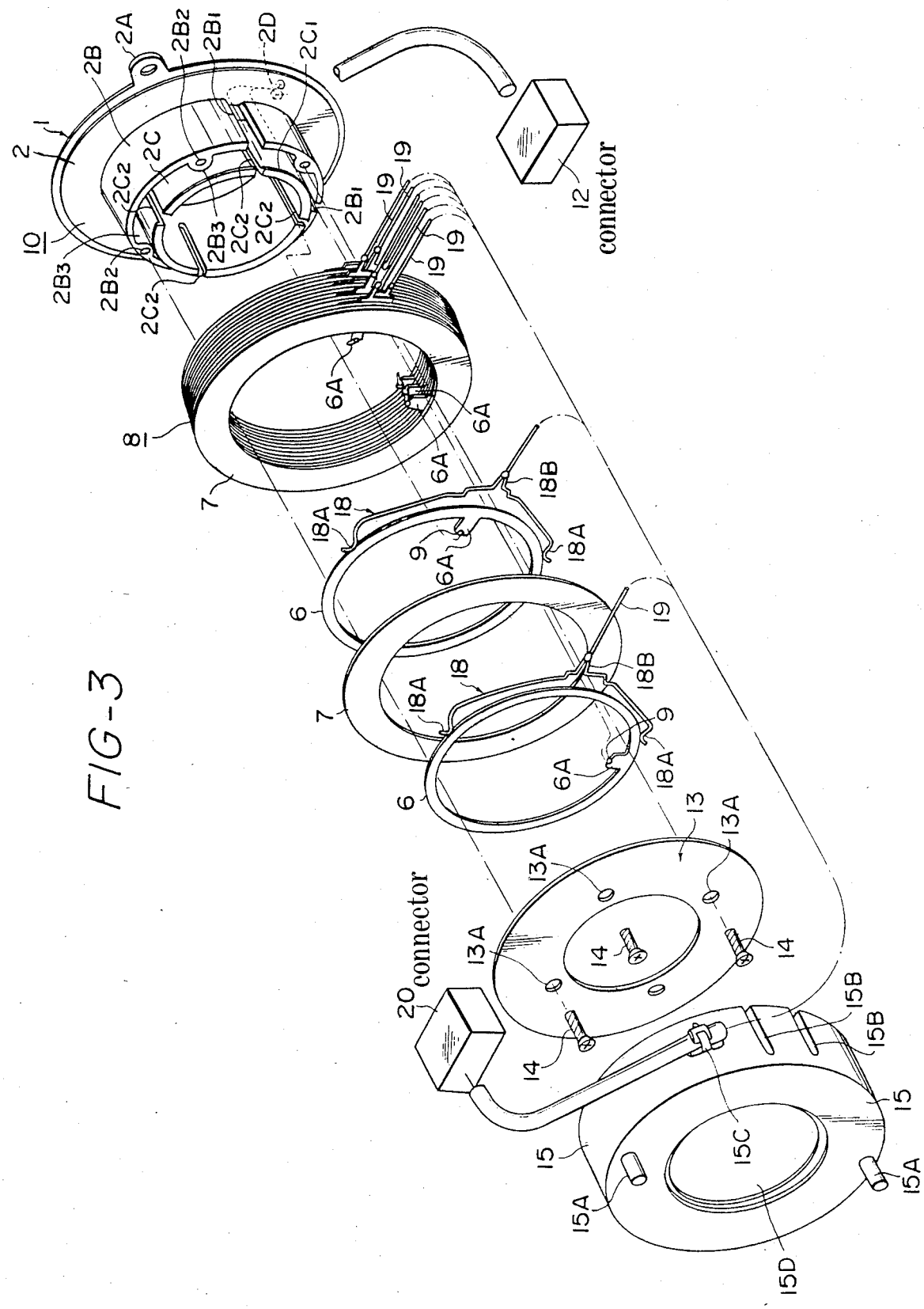
FIG. 3 is a disassembled perspective view showing one example of a slip ring of switches or slidble contact assembly mounted on a sterring wheel according to the present invention.
Figure 4:
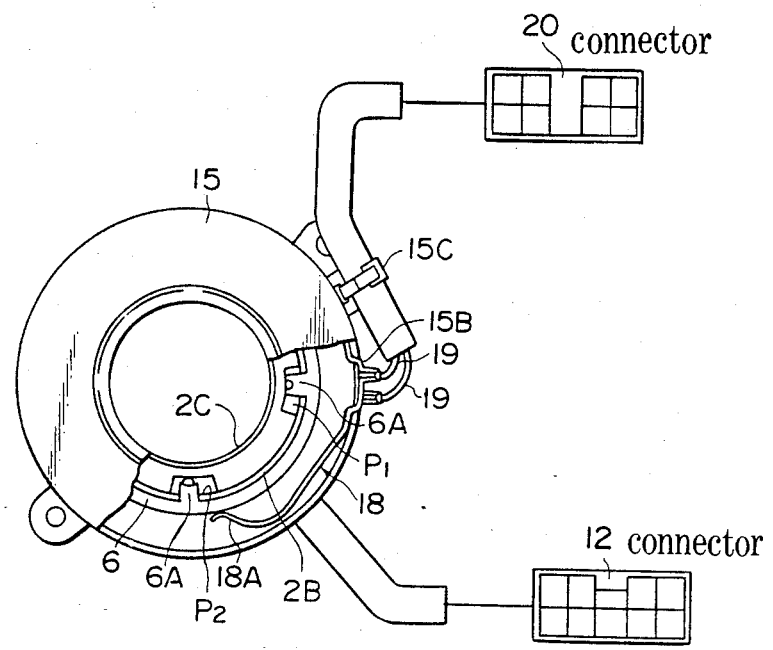
FIG. 4 is a front view showing an assembled condition of the slip ring of FIG. 3 partially cut off.
Figure 5:
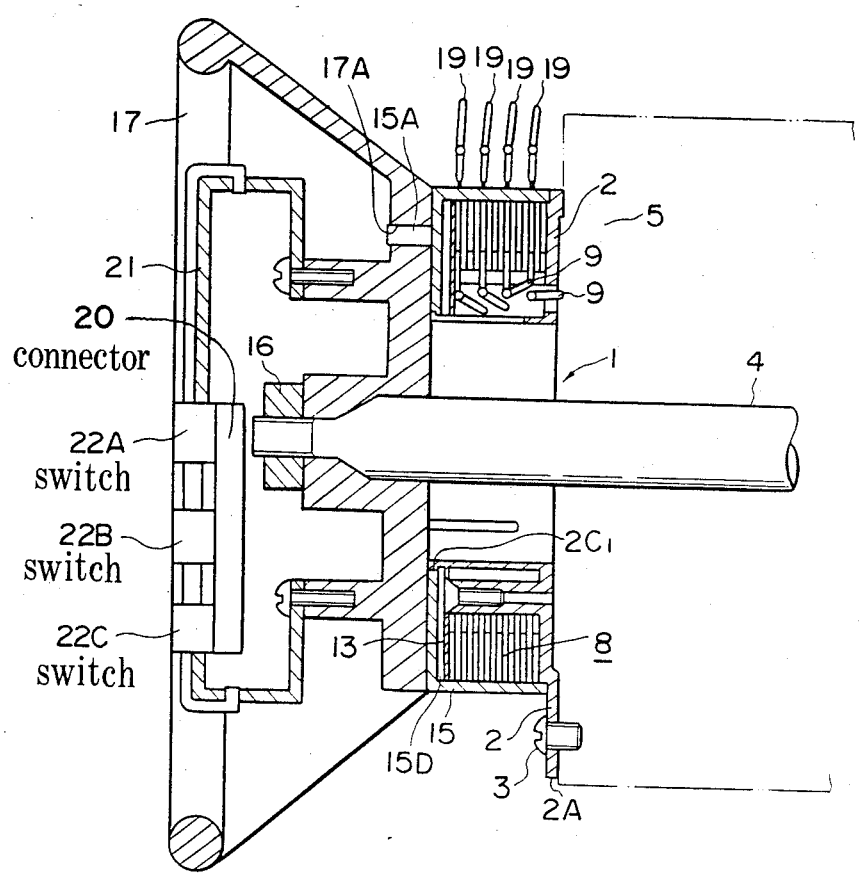
FIG. 5 is a sectional view showing the assembled condition of the slip ring of the switches mounted on the steering wheel according to the present invention.

A base 1 is made of such an insulating material as plastics and consists mainly of a flange base 2 having some projections 2A, 2A (FIGS. 3 and 4) in its peripheral edge. The base 1 is fixed through screws 3 (FIG. 5) at the projections 2A (FIGS. 3 and 4) to a column 5, being one of fixed members, to which a steering shaft 4 is rotatably supported, as shown in FIGS. 3 and 5. In addition, the base 1 is provided projectedly with an outer peripheral wall 2B defining a space 10 for receiving an integrated conducting body 8 consisting of fixed contacts 6 and spacers 7 piled alternately at the front face of the base 1 and also is provided projectedly inside of the outer wall 2B with an inner peripheral wall 2C formed at its whole peripheral edge with nail portion $2C_1$ engaged relative-rotatably with an inner peripheral end of a through-hole 15D of a cover 15. The inner peripheral wall 2C is formed with slits $2C_2$ for causing the inner peripheral wall 2C to engage elastically with the inner peripheral edge structure of the cover 15 defining the through-hole 15D. The fixed contact 6 is made of a conducting material and is formed substantially in a ring shape. The spacer 7 is made of such an insulating material as plastics and also is formed in the same ring shape as the fixed contact 6. The integrated conducting body 8 is such constructed that the fixed contacts 6 and the spacers 7 are arranged alternately and they are piled continuously in a direction of an axis of the steering shaft 4. Each of the fixed contacts 6 is provided projectedly from its inner periphery with a terminal 6A where a lead wire 9 led to a connector 12 is soldered. Also, the respective fixed contacts 6 are displaced alternately by a suitable angle, for example 90°, about the axis of the integrated conducting body 8 regarding the terminals 6A in order to prevent two adjacent fixed contacts 6 from being shorted to one another.

The integrated conducting body 8 is received in the space 10 formed outside of the outer peripheral wall 2B of the base 1. The outer peripheral wall 2B is formed with two slits $2B_1$ opposed to the terminals 6A of the fixed contacts 6. In case that the integrated conducting body 8 is received in the space 10, the terminals 6A of two adjacent fixed contacts 6 are displaced and inserted into the respective slits $2B_1$. Thus, the integrated conducting body 8 is positioned to the space 10. The lead wires 9, one ends of which are connected to the respective fixed contacts 6, are led outside from through-holes P₁ and P₂ formed in the flange base 2 between the inner peripheral wall 2C and the outer peripheral wall 2B and they are bound. The outer ends of the lead wires 9 are connected to a connector 12. For the purpose of prevention of the integrated conducting body 8 received in the space 10 from getting out of the outer peripheral wall 2B, fixed to the outer peripheral wall 2B is a fixing plate 13. The fixation of the fixing plate 13 to the outer peripheral wall 2B is carried out by fastening tapped holes $2B_2$ of ribs formed on the outer peripheral wall 2B and through-holes 13A formed at positions of the fixing plate 13 opposed to the tapped holes $2B_2$ with screws 14, as shown in FIG. 3. Thus, the space 10 is defined.

The cover 15 which is one of the movable members is made of such an insulating material as plastics and it is relatively rotatable about the outer peripheral wall 2B of the base 1 which is one of the fixed members. The cover 15 is arranged on the bottom face of a steering wheel 17 fixed to the steering shaft 4 through a nut 16. The positioning and the fixation of the cover 15 to the steering wheel 17 are conducted by inserting projections 15A formed on the front face of the cover 15 securely into holes 17A formed in the steering wheel 17.

Brought into elastically slidable contact with the respective fixed contacts 6 which are ones of the fixed members are flexible contacts 18, each of which is made of a conductive spring material formed of a plate or a wire material. Each of the flexible contacts 18 is formed at both the end portions thereof with contact portions 18A, 18A bent and also formed at its central portion with an expanded portion 18B expanded outside. On the other hand, the cover 15 is formed at its side wall in its axial direction with two inserting grooves, or slits, 15B, 15B running parallel to one another. The expanded portions 18B of the respective flexible contacts 18 are inserted into the inserting grooves 15B, 15B of the cover 15, and therewith the inner peripheral end of the through-hole 15D is caused to engage with the nail $2C_1$ formed at the whole peripheral edge of the inner peripheral wall 2C. Thus, the flexible contacts 18 are assembled into the cover 15. Soldered to the respective expanded portions 18B of the flexible contacts 18 are one ends of lead wires 19. A bundle of the lead wires 19 is fixed to the cover 15 by a band member 15C mounted on the side wall of the cover 15 and the other ends of the lead wires 19 are connected to a connector 20.

Screwed to the front face of the steering wheel 17 is a switch pad 21, on which several switches 22A, 22B and 22C connected electrically to the connector 20 are mounted.

As set forth above, the integrated conducting body 8 where the fixed contacts 6 and the spacers 7 are alternately piled continuously in the direction of the axis of the steering shaft 4 is received in the space 10 formed outside of the inner peripheral wall 2C and the outer peripheral wall 2B projected co-axially from the front face of the base 1 fixed to the column 5, and the fixing plate 13 is screwed to the outer peripheral wall 2B to thereby prevent the integrated conducting body 8 from getting out of the outer peripheral wall 2B.

In addition, the respective fixed contacts 6 mounted on the base 1 are brought into elastic contact with contact portions 18A and 18A of the respective flexible contacts 18 housed in the cover 15 rotated relatively to the base 1 in accordance with the rotation of the steering wheel 17.

Furthermore, the several switches 22A, 22B and 22C mounted on the switch pad 21 for several applications are electrically connected to loads through the connector 20, the lead wires 19, the flexible contacts 18, the fixed contacts 6 brought into elastic contact with the contact portions 18A and 18A of the flexible contacts 18, the lead wires 9 and the connector 12.

In the present embodiment, thus, the fixed contacts 6 and the flexible contacts 18 brought into elastic contact with each other are arranged in the direction of the axis of the steering shaft 4 so that several to several ten signal lanes can be provided.

Accordingly, the signals are directly transmitted form the switches 22A, 22B and 22C mounted on the switch pad 21 to the loads without the circuit necessary in the prior PCM electrical transmission system, which results in that the present invention is more inexpensive than the PCM electrical transmission system.

Also, two adjacent flexible contacts 18 of the flexible contacts 18 are insulated to one another by the spacers 7 and the lead wires 19 are deviated alternately and are taken out from the two inserting grooves 15B, 15B whereby the short circuit among the lead wires 19 is prevented.

In addition, the positioning of the integrated conducting body 8 consisting of the fixed contacts 6 and the spacers 7 to the space 10 formed outside of the outer peripheral wall 2B can simply and precisely be carried out only by securely inserting the projections 6A provided on the inner peripheries of the fixed contacts 6 into the slits $2B_1$, $2B_1$ of the outer peripheral wall 2B opposed to the projections 6A. Besides, the positioning and mounting of the flexible contacts 18 onto the cover 15 can precisely and easily be conducted by securely inserting the expanded portions 18B of the respective flexible contacts 18 alternately into both the grooves 15B, 15B running parallel to one another.

Furthermore, the mounting of the cover 15 onto the steering wheel 17 can also be effected easily and securely by inserting the projections 15A, 15A provided on the front face of the cover 15 into the holes 17A formed in the steering wheel 17.

Description will hereinunder be given of operation of the present embodiment.

In accordance with the rotation of the steering wheel 17 the steering shaft 4 is also rotated together therewith. Also, the steering wheel 17 is provided with the cover 15 having the flexible contacts 18 and, therefore, the cover 15 is rotated in accordance with the rotation of the steering wheel 17, whereby the flexible contacts 18 are slided along the periphery of the integrated conducting body 8, particularly the fixed contacts 6. However, since the contact portions 18A of the respective flexible contacts 18 are always pushed to the outer periphery of the integrated conducting body 8 owing to the elastic forces possessed in the flexible contacts 18, the circuits of the switches 22A, 22B and 22C are not easily broken between the fixed contacts 6 and the flexible contacts 18.

Accordingly, if the switches 22A, 22B and 22C are subjected to pushing operations, the signals can be transmitted directly to the loads owing to that the contact portions 18A of the flexible contacts 18 are always in contact with the fixed contacts 6, which results in a secure, or reliable, operation.

In this embodiment the flexible contacts 18 are fixed to the steering wheel 17 which is one of the movable members and the fixed contacts 6 being in contact with the flexible contacts 18 are mounted to the base 1 fixed to the column 5 which is one of the fixed members.

However, the flexible contacts 18 may be mounted on the base 1 and the fixed contacts 6 may be mounted to the cover 15.

The above embodiment is directed to the slip ring of the switches mounted on the steering wheel of the vehicle but the present invention is not limited only thereto. That is, the present invention is applicable widely to a slip ring having such a structure that one of the fixed member and the movable member is mounted on the integrated conducting body and the other is provided with flexible contacts being in slidable contact with the integrated conducting body.

What is claimed is:

1. A slidable contact assembly unit in combination with switches mounted on a steering wheel assembly of a vehicle, which comprises a base member and a cover member, said members being supported on the vehicle steering wheel assembly such that one member rotates relative to the other when the steering wheel is rotated and about an axis of steering wheel rotation, said base member having a peripheral wall disposed symmetrical of said axis, said base member further having a flange at one end of said peripheral wall, a plurality of ring-like contacts made of thin conductive plates and disposed encirclingly on said peripheral wall, ring-like spacers made from insulating material and disposed between the adjacent ones of said pluarlity of ring-like contacts to insulate them from each other, the outer diameter of each spacer being larger than that of each contact thereby defining an annular recess between adjacent spacers, and a plurality of spring contacts made of conductive wire and supported by the cover member, said spring contacts each being urged into contact with an associated one of said ring-like contacts and remaining in contact thereto when said base and cover members are rotated one relative to the other, each ring-like contact being provided with a radially directed terminal for connection of a lead wire thereto, said base member peripheral wall having two slits extending therein coaxial with the rotation axis, the terminals of alternate ones of said ring-like contacts being received in one of said base slits and the terminals of the remaining ring-like contacts being received in the other base slit thereby to prevent said ring-like contacts from coming into shorting contact one with the others, said cover member having a peripheral wall part, said cover wall part having two slits formed therein coaxial with said rotation axis, a portion of alternate ones of said spring contacts being received in one of said cover slits, and portions of the remaining ones of said spring contacts being received in the other cover slit thereby to prevent said spring contacts from coming into shorting contact one with the other.

2. The combination as set forth in claim 1 in which the terminals of the alternate ones of said ring-like contacts are circularly spaced relative to those of the remaining ones of said ring-like contacts.

3. The combination as set forth in claim 2 in which the circular spacing between the alternate ones and the remaining ones of said terminals is substantially 90°.

4. The combination as set forth in claim 1 in which each of said wire contacts has two branches, tip portion of both branches being in contact with its associated ring-like contact.

5. The combination as set forth in claim 1 in which a fixing plate is disposed on said base member peripheral wall at the end thereof opposite said flange, said base member peripheral wall having means therein receptive of a connector for securing said fixing plate to said peripheral wall to thereby retain said ring-like contacts and said ring-like spacers securely on said base member peripheral wall.

6. The combination as set forth in claim 1 in which said base member is fixed to structure on said steering wheel assembly, said cover member being connected to said steering wheel to rotate therewith.

* * * * *